(No Model.)

V. H. McCONNELL.
FILTER.

No. 469,450. Patented Feb. 23, 1892.

Witnesses:
Emil Neuhart
Friedrich Gustav Wilhelm

V. H. McConnell
Inventor.
By Wilhelm Bonner
Attorneys

UNITED STATES PATENT OFFICE.

VIRGIL H. McCONNELL, OF BUFFALO, NEW YORK.

FILTER.

SPECIFICATION forming part of Letters Patent No. 469,450, dated February 23, 1892.

Application filed June 30, 1891. Serial No. 397,978. (No model.)

*To all whom it may concern:*

Be it known that I, VIRGIL H. MCCONNELL, a citizen of the United States, residing at Buffalo, in the county of Erie and State of New York, have invented new and useful Improvements in Filters, of which the following is a specification.

This invention relates to pressure-filters which are provided with means for reversing the course of the water through the same for cleansing the filter-bed.

My invention has for its object to so construct the apparatus that the entire bed of filtering material is repeatedly loosened and dislodged upon reversing the current of water through the filter, thus cleansing the filter in a thorough and rapid manner.

Figure 1:
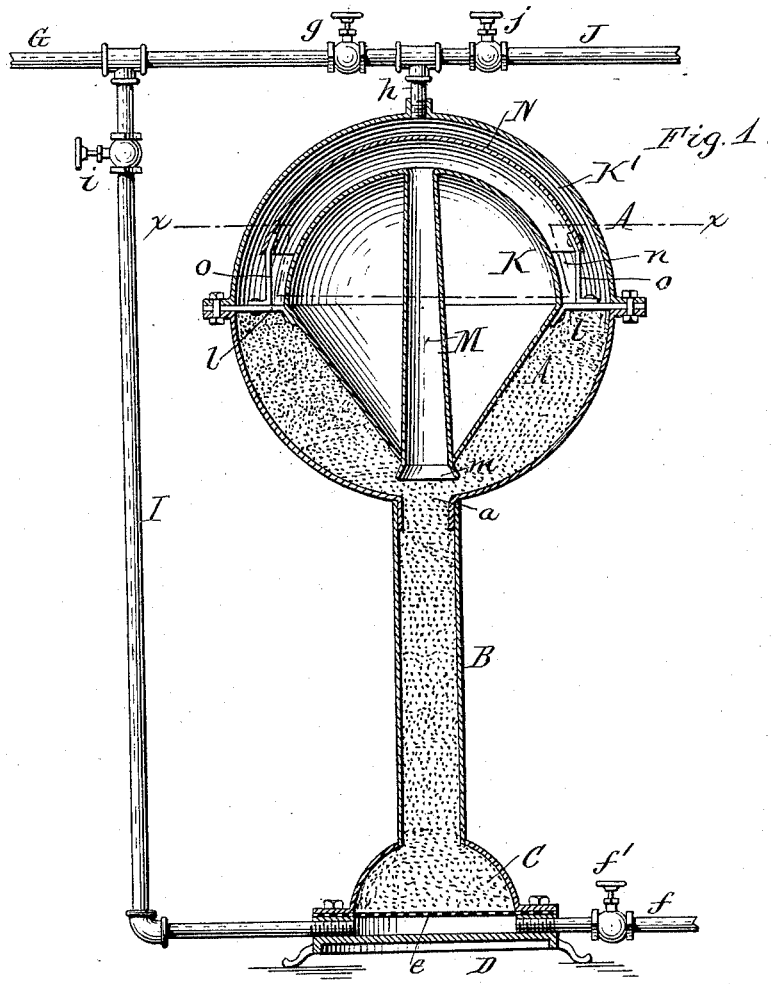
Figure 2:
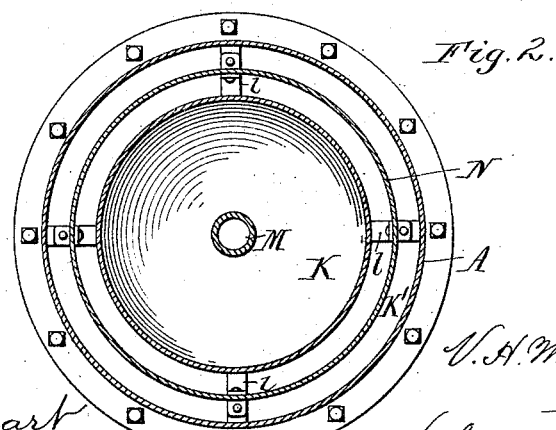

In the accompanying drawings, Figure 1 is a sectional elevation of my improved filter. Fig. 2 is a horizontal section thereof in line $x\ x$, Fig. 1.

Like letters of reference refer to like parts in both figures.

A represents an upper or main filtering-chamber, which is preferably of globular form, and B is a tubular post or standard forming a lower filtering-chamber and communicating at its upper end with the bottom of the upper chamber by means of an opening $a$. The lower end of the chamber B is connected with the top of a discharge-chamber C, which is supported upon a suitable base D.

$e$ is a horizontal strainer or perforated plate arranged within the discharge-chamber a short distance above its bottom, and $f$ is an exit-pipe connected with the discharge-chamber below the strainer and having a valve $f'$ for controlling the discharge of the purified water. The lower filter-chamber B and the portion of the discharge-chamber above the strainer are entirely filled with sand or other filtering material, while the upper chamber A is filled only to about its middle, as shown.

G is the water-supply pipe, and $h$ a branch connected with the supply-pipe and entering the top of the upper chamber. The supply-pipe is provided with a stop-cock $g$ for shutting off the flow of water to the filter.

I is a washing-pipe connected at its upper end with the supply-pipe G beyond the valve $g$ and at its lower end with the discharge-chamber C. This washing-pipe is provided with a valve $i$ for shutting off the flow of water through the same.

J is a waste-pipe connected with the branch pipe $h$ and having a valve $j$.

K is a spreader or distributer arranged within the upper chamber A and consisting, preferably, of a convex or hemispherical upper part and a conical or downwardly-tapering lower part. The convex upper portion of the spreader is curved concentrically with the surrounding shell or chamber A and is separated therefrom by an intervening water space or passage K', with which the branch $h$ communicates. The spherical chamber A is preferably composed of flanged hemispherical sections, which are united by bolts passing through their flanges. The spreader K is supported in the chamber A by inwardly-projecting arms $l$, secured with their outer portions between the flanges of the main chamber and at their inner ends to the central portion of the spreader.

M is an ascending pipe or passage extending centrally from the bottom to the top of the spreader and through which the filtering material is carried by the water in cleansing the filter. The ascending passage M opens at its upper end into the water-space above the spreader, while its lower end terminates at a short distance above the outlet $a$ in the bottom of the upper chamber A, so as to leave a space through which the filtering material passes from the bottom of the upper chamber A into the contracted lower chamber B. The ascending pipe M is preferably provided with a flaring mouth $m$ for facilitating the entrance of the water and filtering material into the same.

N is a guard arranged in the water-space K' above the spreader, whereby the water entering the main chamber is prevented from descending through the passage M without first passing through the main filter-bed, and the water and filtering material are prevented from escaping directly through the branch pipe $h$ into the waste-pipe J upon reversing the course of the water. This guard is preferably made spherical to conform to the upper surface of the spreader and extends downwardly to within a short distance of the surface of the filtering-bed, so as to leave an annular passage n between the top of the filter-bed and the lower edge of the guard through which the waste water passes into the space between the inner wall of the chamber A. The guard is supported by feet or standards o, secured to the supporting-arms l of the spreader.

When the filter is in operation, the valve g of the supply-pipe and the valve f' of the discharge-pipe are open, while the valve i of the washing-pipe and the valve j of the waste-pipe are closed. The water entering the upper chamber A through the branch pipe h flows over the guard N, percolates through the filter-beds of the upper and lower chambers A B, and enters the discharge-chamber C, from which latter it is conducted to the place of consumption by the discharge-pipe f. The strainer in the discharge-chamber C retains the filtering material, while the purified water passes through the same. The upper filter-bed intercepts the bulk of the impurities in the water, while the lower bed retains the remaining foreign matter.

When it is desired to cleanse the filter, the valve g of the supply-pipe and the valve f' of the exit-pipe are closed, and the valve i of the washing-pipe and the valve j of the waste-pipe J are opened. The water now passes from the supply-pipe G, through the washing-pipe I, and into the discharge-chamber C and rises through the lower contracted filter-chamber B and the ascending passage M of the spreader. It then flows over the latter, and diving under the lower edge of the guard ascends in the space between the guard and the inner wall of the main chamber and finally escapes through the branch pipe h into the waste-pipe J, from which latter it is conducted to the sewer. As the lower chamber B is of comparatively small area, the filtering material in said chamber is lifted and carried through the ascending passage M by the water-pressure, and as it emerges from the upper end of the passage it is distributed in all directions by the spreader and settles to the surface of the upper filter-bed, while the waste-water containing the impurities escapes through the branch pipe h into the waste-pipe, as before described. As the filtering material in the lower contracted chamber is constantly dislodged and lifted into the upper chamber by the pressure of the water, the filtering material in the bottom of the upper chamber descends into the contracted lower chamber and is in turn elevated and carried through the ascending passage and caused to settle in the upper chamber freed from impurities. The entire bed of filtering material is thus loosened and repeatedly displaced, producing a constant revolution of the material, whereby all the particles are thoroughly freed from adhering impurities by the attrition of the particles against each other and the flow of water maintained through the filter. By causing the filtering material to be spread after being elevated above the surface of the upper filter-bed all portions thereof are exposed to the action of the water, whereby the particles are effectually cleaned. The ascending passage M is preferably tapered upwardly, as shown, to still further concentrate the water-pressure in the passage in cleansing the filter. Upon again reversing the course of the water for filtering the filter-beds settle to their former position.

The upper filtering-chamber may be of any other suitable form than that shown in the drawings; but its sides preferably incline or slope toward its outlet a, so as to direct the filtering material toward the upper end of the contracted lower chamber.

I claim as my invention—

1. In a filter, the combination, with an upper filtering-chamber provided in its bottom with an outlet and having the walls of its lower portion sloping toward said outlet, of a tubular imperforate standard of smaller cross-sectional area than the upper filtering-chamber, communicating at its upper end with the outlet of the upper filtering-chamber and forming a contracted lower filtering-chamber, a discharge-chamber communicating with the lower end of the contracted filtering-chamber, an inlet-pipe connected with the upper filtering-chamber, and a washing-pipe connected with said discharge-chamber, whereby upon reversing the course of the water through the filter the filtering material in the tubular standard is lifted into the upper chamber by the water entering the discharge-chamber through the washing-pipe, substantially as set forth.

2. In a filter, the combination, with an upper filtering-chamber provided in its bottom with an outlet and having the walls of its lower portion sloping toward said outlet, of a tubular imperforate standard of smaller cross-sectional area than the upper filtering-chamber, communicating at its upper end with the outlet of the upper filtering-chamber and forming a contracted lower filtering-chamber, a discharge-chamber communicating with the lower end of the contracted filtering-chamber, supply and waste pipes connected with the upper filtering-chamber, and a washing-pipe leading from said supply-pipe to the discharge-chamber, substantially as set forth.

3. In a filter, the combination, with an upper filtering-chamber provided in its bottom with an outlet and having the walls of its lower portion sloping toward said outlet, of a lower contracted filtering-chamber communicating with the outlet of the upper chamber, a spreader arranged in the upper filtering-chamber above the filtering medium, and a passage extending from a point opposite the outlet of the upper chamber to the top of the spreader, through which the filtering material in the lower chamber is elevated upon reversing the course of the water through the filter, substantially as set forth.

4. In a filter, the combination, with an upper filtering-chamber provided with an outlet in its bottom and having inclined or sloping walls, whereby the filtering material is directed toward said outlet, and a lower contracted filtering-chamber communicating with the outlet of the upper filtering-chamber, of a spreader arranged in the upper filtering-chamber and provided with a vertical passage extending centrally through the spreader and in line with the lower contracted filtering-chamber, substantially as set forth.

5. In a filter, the combination, with an upper filtering-chamber provided with an inlet in its top and an outlet in its bottom and having converging walls, whereby the filtering material is directed toward said outlet, of a lower contracted filtering-chamber communicating with the outlet of the upper filtering-chamber, a spreader arranged in the upper filtering-chamber, a vertical pipe or passage extending centrally through the spreader in line with the lower contracted filtering-chamber, and a guard or deflector arranged in the upper filtering-chamber between its inlet and the spreader, substantially as set forth.

6. The combination, with an upper filtering-chamber provided with an outlet in its bottom and having converging lower walls, of a lower contracted filtering-chamber communicating with the outlet of the upper filtering-chamber, a discharge-chamber arranged below the filtering-chambers, an inlet-pipe opening into the upper filtering-chamber, a supply-pipe and waste-pipe connected with said inlet-pipe, a spreader arranged in the upper filtering-chamber, a vertical pipe or passage extending through the spreader, a guard or deflector arranged between the spreader and the water-inlet pipe, and a branch or washing pipe connecting the supply-pipe with the discharge-chamber, substantially as set forth.

Witness my hand this 15th day of June, 1891.

VIRGIL H. McCONNELL.

Witnesses:
JNO. J. BONNER,
FRED. C. GEYER.